(12) United States Patent
Chiwata et al.

(10) Patent No.: US 7,901,782 B2
(45) Date of Patent: Mar. 8, 2011

(54) SOLDER ALLOY AND GLASS BONDED BODY USING THE SAME

(75) Inventors: Nobuhiko Chiwata, Yasugi (JP); Minoru Yamada, Koganei (JP); Motoki Wakano, Yasugi (JP)

(73) Assignee: Hitachi Metals, Ltd., Tokyo (JP)

( * ) Notice: Subject to any disclaimer, the term of this patent is extended or adjusted under 35 U.S.C. 154(b) by 467 days.

(21) Appl. No.: 12/058,369

(22) Filed: Mar. 28, 2008

(65) Prior Publication Data

US 2008/0241552 A1     Oct. 2, 2008

(30) Foreign Application Priority Data

Mar. 29, 2007   (JP) ................. 2007-087067
Oct. 23, 2007   (JP) ................. 2007-274571

(51) Int. Cl.
*B32B 17/06*     (2006.01)
*C22C 13/00*     (2006.01)

(52) U.S. Cl. ......... 428/434; 420/557; 428/426; 428/432; 428/457

(58) Field of Classification Search ........................ None
See application file for complete search history.

(56) References Cited

U.S. PATENT DOCUMENTS 6,319,617 B1   11/2001   Jin et al.
2009/0208363 A1*   8/2009   Yamada et al. ............... 420/557

FOREIGN PATENT DOCUMENTS

| EP | 1245328 A1 | 10/2002 |
| JP | 59-128279 | * 7/1984 |
| JP | 11129091 A | 5/1999 |
| JP | 2000141078 A | 5/2000 |
| JP | 2003211283 A | 7/2003 |
| JP | 2006319215 A | 11/2006 |
| WO | 2007007840 A1 | 1/2007 |

OTHER PUBLICATIONS

Translation of JP-59-128279.*
Chinese Office Action dated Jul. 29, 2010.

* cited by examiner

*Primary Examiner* — Ling Xu
(74) *Attorney, Agent, or Firm* — Sughrue Mion, PLLC

(57) ABSTRACT

The invention provides a solder alloy containing, by mass, 2.0 to 15.0% of Ag, 0.1 to 6.0% of Al, 0.01 to 0.50% of Y, the balance being Sn and unavoidable impurities. The solder alloy preferably contains 0.01 to 0.50% of Ge by mass. The solder alloy of the invention is suited to bonding oxides together and the oxides preferably comprise glass. The invention provides a glass bonded body formed by bonding glasses with the use of the solder alloy.

7 Claims, 1 Drawing Sheet

500 μm

SOLDER ALLOY AND GLASS BONDED BODY USING THE SAME

This application claims priority from Japanese Patent Application No. 2007-087067, filed on Mar. 29, 2007, and Japanese Patent Application No. 2007-274571 filed Oct. 23, 2007, the disclosure of which is incorporated herein by reference in its entirety.

TECHNICAL FIELD

The present invention relates to a solder alloy suited for bonding of metals, such as Al, having a bad wettability due to formation of an oxide skin, and suited for bonding of oxide materials, such as glass, or ceramic. The invention also relates to a glass bonded body, such as pair-glass, vacuum vessel, gas-charged vessel, etc., in which a sealed portion is sealed with a leadless alloy solder.

BACKGROUND OF THE INVENTION

Conventionally, a solder containing lead or a lead glass frit have been mainly used in bonding and sealing of oxides such as glass, etc. around 380° C. However, lead has been inadmissible to use due to environmental problems. On the other hand, while reviewing various brazing filler metals, brazing sheet, etc. described in "JIS Handbook (3) Nonferrous metal", it is difficult to find such a material as having a melting point at or below 400° C., having good adhesion properties, and causing no shrinkage crack on glass due to a difference in coefficient of thermal expansion between glass and the brazing filler metal.

The inventors of the application have recently proposed a solder alloy for bonding oxides, which contains Sn as a main component and to which Ag and Al are added (see WO2007-007840).

As a solder alloy having a low melting point and containing no lead, the solder alloy proposed in WO2007-007840 has an excellent bonding strength and an airtight sealing performance for oxide materials such as glass, ceramic, etc.

However, in bonding with the solder, a surface of the molten solder is oxidized and an oxide is generated in some cases. Since the oxide does not contribute to bonding, it results in a decrease in bonding strength and airtight sealing performance.

Also, when gases are generated in a solder or taken in from the atmosphere, the gases expand in the molten solder during heating after bonding, and sometimes voids generate in the solder. In particular, when heating and sealing in vacuum are carried, there is caused a problem that gases in voids are liable to expand to large voids so as to damage bonding strength and airtight sealing performance. There is also caused a problem that bonding strength is decreased, and results in generation of leakage in the case where a large amount of oxide is generated on bonded interfaces at the time of bonding.

SUMMARY OF THE INVENTION

It is an object of the invention to dissolve the disadvantage and provide a solder alloy which attains a bonding strength and an airtight sealing performance, and a glass bonded body using the same.

The inventors of the application have found that a Sn-based and leadless alloy solder having the following composition enables soldering of a high bonding strength directly to oxide materials such as glass, etc.

According to one aspect of the invention, is provided a solder alloy containing, by mass, 2.0 to 15.0% of Ag, 0.1 to 6.0% of Al, 0.01 to 0.50% of Y, the balance being Sn and unavoidable impurities.

The amount of Y is preferably 0.05 to 0.10% Y by mass.

Preferably, the solder alloy further contains 0.01 to 0.50% Ge by mass. The amount of Ge is more preferably 0.01 to 0.05% by mass.

The solder alloy of the invention is suited to bonding oxides. The oxides comprise preferably glass.

According to another aspect of the invention, a glass bonded body obtained by bonding glasses with the alloy solder is obtained.

The solder alloy provided by the invention is harmless to the environment since it does not contain lead and have excellent bonding strength and airtight sealing performance. It is possible to select a working temperature in a low heating range of 230 to 400° C. in sealing of, for example, pair-glass, glass vessel, etc., and thus thermal energy may be saved.

DETAILED DESCRIPTION OF THE INVENTION

Figure 1:
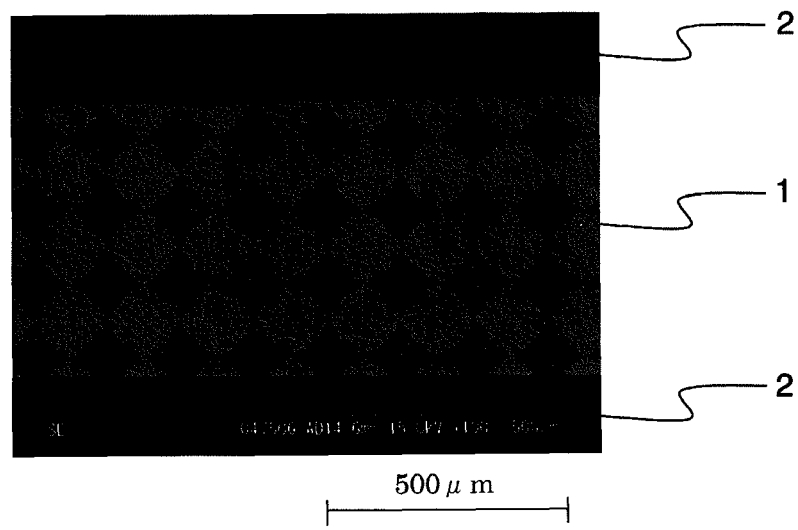
FIG. 1 is an electron photomicrograph showing an example of a bonded section when soda-lime glass substrates are bonded together with the use of the solder alloy of the invention.

An explanation will be given below to the reason why a solder alloy of the invention is limited to the contents (the contents below are by mass %). Al: 0.1 to 6.0%

Al (aluminum) is an essential metal for a Sn—Ag solder alloy of the invention in order to attain bonding to an oxide. While a Sn—Ag solder alloy is difficult to bond to an oxide even when a ratio of Sn to Ag is changed, addition of Al achieves an improvement in wettability to an oxide to enable adhesion to the oxide. The reason for this is since Al has an intense tendency to become an oxide which is liable to bond to an oxide, and thus wettability to the oxide is improved.

When the alloy contains Al too much, however, Al may form an oxide excessively to cause a decrease in adhesion and a lot of solidification shrinkage which lead to cracks in a bonded body (oxide) after bonding. Therefore, the amount of Al is defined to be 0.1 to 6.0% in consideration of the relation to a Ag content. Preferable an amount of Al is 0.1 to 1.0% and 0.1 to 0.5% is more preferable.

Ag: 2.0 to 15.0%

Ag (silver) controls an added amount of Al to Sn optimally and thus is an essential metal for the solder alloy of the invention, in which Al is added to Sn. Furthermore, Ag is an important and essential element since it suppresses formation of an oxide skin of a metal in the solder.

When the solder alloy contains Ag too much, a large quantity of an intermetallic compound is formed throughout the solder, and they decrease bonding strength since they are hard and brittle.

On the other hand, when a smaller amount of Ag is contained, a bonding strength is insufficient since hardness of the solder due to the intermetallic compound is not sufficient. Sn is a main component but is a soft metal.

Furthermore, a quantity of Al solid-soluted in Sn cannot be ensured and thus wettability to an oxide material to be bonded is also decreased. Therefore, the solder alloy according to the invention contains 2.0 to 15.0% of Ag in consideration of the relation to the amount of Al. Preferably, the solder alloy contains 3.5 to 10.0% of Ag, and 5.0 to 9.0% is more preferable.

Y: 0.01 to 0.50%

Y (yttrium) is optimum in decreasing generation of voids during melting of the solder, and thus is an essential metal for the solder alloy according to the invention. While the mechanism how Y restricts the generation of voids is not clearly known, it is estimated that Y decreases a surface tension of the molten metal and reduces entrainment of gases.

However, too large amount of Y generates voids. The mechanism for this is not apparent while it is guessed that a viscosity of the solder itself is changed due to formation of an intermetallic compound of Y and Al. Therefore, it is preferable that the amount of Y in the solder alloy is limited to a minimum. Therefore, the amount of Y according to the invention is preferably 0.01 to 0.50%, and 0.05 to 0.10% is more preferable.

Ge: 0.01 to 0.50%

It is desired that the solder alloy according to the invention contains Ge (germanium) in order to bond to an oxide such as glass, etc. Since Ge serves to control generation of an oxide on a solder surface optimally, it is an additional element useful for the solder alloy according to the invention. Ge itself is liable to make an oxide and thus it is estimated that an effect for suppression of oxidization of the solder itself is obtained.

When the solder ally contains Ge too much, however, the effect for suppression of surface oxidization is not obtained and the quantity of an oxide of Ge itself is increased to lead to generation of a surface oxide much on the solder surface. Besides, it has adverse affect on adhesion to glass and glass cracks after bonding when the Ge content is excessive. Accordingly, the amount of Ge is preferably not more than 0.50%. In order to restrict influences of a surface oxide to the minimum, not more than 0.05% of Ge is more preferable.

On the other hand, when the Ge content is restricted, it does not adequately effect on surface oxidization, and thus the amount of Ge in according to the invention is preferably not less than 0.01%.

The solder alloy according to the invention preferably contains both of Y and Ge. Addition of the both elements generates a synergistic effect on the solder alloy. Owing to addition of a small amount of Y, voids are suppressed and addition of a trace quantity of Ge enables dramatic suppression of generation of a surface oxide.

The Balance being Sn and Unavoidable Impurities

Sn (tin) is a base element for the solder alloy according to the invention. Sn reduces difference of a coefficient of thermal expansion from that of an oxide and lowers a melting temperature. In particular, for regulation of the coefficient of thermal expansion, Sn is desirably contained in the range of 85 to 95%. 90 to 95% is more preferable.

Fe, Ni, Co, Cr, V, and Mn, as unavoidable impurities, inhibit wettability of the solder and thus they are preferably restricted to not more than 1% in total. Not more than 500 ppm in total is more preferable.

Since Ga, P, and B cause voids, these elements are preferably restricted to not more than 500 ppm. More specifically, not more than 100 ppm is desirable.

The solder alloy according to the invention can attain excellent bonding strength and airtight sealing performance even when the bonded objects are oxides or nitrides. The solder alloy exhibits an excellent bonding ability for all oxides as well as for ceramic such as alumina, and glass such as soda-lime glass. In addition, the solder alloy has an excellent bonding ability for nitrides, such as aluminum nitride.

Furthermore, the solder alloy according to the invention is used not only for bonding between oxides or nitrides or therebetween, but also for other materials than oxides or nitrides, for which the bond ability can be ensured. For example, the solder alloy has bonding ability for metals such as Al alloys, various stainless steels, copper, and Fe—Ni alloys. Even if a material to be bonded may be poor in bond ability, the solder alloy is not limited in use when the material is subjected to surface treatment for obtaining the bonding ability.

The solder alloy according to the invention may be also used for substitution of surface treatment for soldering. For that purpose, the solder alloy may be applied on surfaces of oxides or nitrides.

In using the solder alloy according to the invention, the solder alloy melted by a soldering iron may be applied to a material to be bonded. Likewise, the solder alloy melted by the soldering iron may be applied to an oxide, a nitride, etc., which generally have a less wettability for a metallic solder.

A glass bonded body having an excellent bonding strength is obtained, e.g. by bonding glass materials, to which a solder alloy of the invention is applied. As a manner for applying the solder alloy, the solder alloy may be melted and poured between surfaces of materials to be bonded which are preassembled in a finished configuration, or one of materials to be bonded is placed on the other material to be bonded having a surface on which the solder alloy is placed.

EXAMPLES 1

Sn, Ag, Al, Y, and Ge were weighed to give compositions in TABLE 1, and were melted in an Ar atmosphere. They were then cast into a mold to fabricate solder alloys. The solder alloys thus obtained were evaluated as described below.

After the solder alloy 1 of Example No. 10 of the invention was coated on surfaces of two soda-lime glass substrates 2 having a width of 10 mm, a length of 10 mm, and a thickness of 0.8 mm, surfaces with the solder alloy coated thereon were overlapped and bonded. FIG. 1 shows results of a bonded section observed with an electron microscopy. It was confirmed that no voids were present and favorable bonding was achieved.

(Measurement of Surface Oxidation Rate)

The solder alloy having a width of 20 mm, a length of 50 mm, and a thickness of 0.2 mm was applied on a surface of a lower soda-lime glass substrate having a width of 50 mm, a length of 50 mm, and a thickness of 3 mm, and then an upper glass was placed for bonding on the surface of the lower substrate in a state in which the solder alloy was melted. An oxide on the solder alloy surface was observed through the upper soda-lime glass substrate. The oxide has no metallic luster but generated a cloudy contrast. The solder surface thus applied was photographed through the upper soda-lime glass substrate by a digital camera.

Image analysis was employed to integrate the area distribution of the cloudy oxide on the solder alloy surface to calculate a ratio of the integrated value in relation to the whole area on which the solder alloy was applied. The ratio is defined as a surface oxidation rate. When the oxide covers whole the solder surface, the rate is 100%. The rate is 0%, when no oxides are observed.

Since a surface oxide causes a decrease in strength at the time of bonding and leakage in the bonded region, it is desired that the surface oxidation rate is not more than 30%.

(Measurement of Void Incidence Rate)

The solder alloy having a width of 20 mm, a length of 50 mm, and a thickness of 0.2 mm was applied on a surface of a lower soda-lime glass substrate having a width of 50 mm, a length of 50 mm, and a thickness of 3 mm, and then an upper glass was placed for bonding on the surface of the lower substrate in a state in which the solder alloy was melted. The overlapped substrates were pressed for fixing, and heated in a vacuum chamber. A heater was used to heat at 350° C. for 20 minutes. At this time, an inner pressure in the chamber was not more than 10 Pa and a vacuum atmosphere was kept so as to make voids liable to generate. After the heating, gradual cooling was carried out to a room temperature.

Since voids generated between glasses of the bonded body transmit light through the glasses, the voids were estimated by observing the transmitted light. In measurement of the voids, the light transmitting through the voids was photographed by a digital camera and areas thereof were integrated by image processing. A ratio of the area of the transmitted light in relation to the area of the whole bonded surface was calculated to provide a void incidence rate.

(Observation of Crack)

In some cases, a crack is generated in glass due to internal stress generated in solder bonding when the solder alloy is applied to the glass. Since a crack is not suited to bonding, the glass after solder bonding was observed and the presence of the crack was confirmed.

TABLE 1 shows results of measurements with the testing method described above.

As indicated in Examples Nos. 1 to 13 of the invention in TABLE 1, addition of Y makes the surface oxidation rate not more than 30%. Thus, the effectiveness of the invention was confirmed. In case of addition of Y singly, the surface oxidation rate could be restricted, as indicated by Example No. 1 of the invention. The void incidence rate could be restricted to not more than about 1% by addition of Y by 0.3%, as indicated by Example No. 2 of the invention.

On the other hand, as indicated by Comparative examples Nos. 16 to 18 in TABLE 1, the tendency of a decrease in surface oxidation rate was found even when Ge was added singly. However, the addition of Ge singly by 0.28% or 0.47% gave rise to crack in the glass at the time of bonding of the glass. This is inferred that adhesion force to the glass was excessively increased due to the addition of Ge and stress was generated in the glass at the time of solidification shrinkage after the solder bonding.

As indicated in Examples Nos. 3 to 13 of the invention in TABLE 1, the surface oxide could be further reduced by addition of both of Y and Ge. In particular, as indicated in Examples Nos. 4 to 13 of the invention, in case of addition of Y by not more than 0.1% and Ge by not more than 0.5%, the surface oxidation rate was small and the void incidence rate was also restricted to not more than 5%. In Examples Nos. 6, and 9 to 13 of the invention in TABLE 1, in which Ge was added by $0.01\% \leq Ge \leq 0.05\%$, the void incidence rate could be restricted to not more than 0.1% and thus it was confirmed that composite containing both of Y and Ge was effective in the invention.

In the alloy containing both Y and Ge, no cracks were observed in the glass, while the cracks were problematic when Ge was added singly. This is inferred that an increase in adhesion force to the glass could be prevented as compared with the case where Ge was added singly, since oxides of Y and Ge on a metal surface were formed respectively.

TABLE 1

| No. | COMPOSITION (MASS %) | | | | | SURFACE OXIDATION RATE (%) | VOID INCIDENCE RATE (%) | PRESENCE OF CRACK OF GLASS | |
|---|---|---|---|---|---|---|---|---|---|
| | Sn | Ag | Al | Y | Ge | | | | |
| 1 | bal. | 8.5 | 0.3 | 0.10 | — | 8.8 | 18.7 | ABSENT | EXAMPLE OF THE INVENTION |
| 2 | bal. | 8.5 | 0.3 | 0.30 | — | 1.3 | 0.4 | ABSENT | |
| 3 | bal. | 8.5 | 0.3 | 0.10 | 0.30 | 12.8 | 0.2 | ABSENT | |
| 4 | bal. | 8.5 | 0.3 | 0.05 | 0.03 | 5.6 | 0.9 | ABSENT | |
| 5 | bal. | 8.5 | 0.3 | 0.05 | 0.01 | 8.4 | 2.7 | ABSENT | |
| 6 | bal. | 8.5 | 0.3 | 0.08 | 0.05 | 2.6 | 0.0 | ABSENT | |
| 7 | bal. | 8.5 | 0.3 | 0.10 | 0.01 | 2.2 | 0.6 | ABSENT | |
| 8 | bal. | 8.5 | 0.3 | 0.05 | 0.05 | 5.7 | 1.4 | ABSENT | |
| 9 | bal. | 8.5 | 0.3 | 0.10 | 0.03 | 1.0 | 0.0 | ABSENT | |
| 10 | bal. | 8.5 | 0.3 | 0.08 | 0.03 | 0.9 | 0.0 | ABSENT | |
| 11 | bal. | 8.5 | 0.3 | 0.08 | 0.01 | 1.7 | 0.0 | ABSENT | |
| 12 | bal. | 8.5 | 0.3 | 0.08 | 0.03 | 0.5 | 0.0 | ABSENT | |
| 13 | bal. | 8.5 | 0.3 | 0.10 | 0.05 | 1.6 | 0.1 | ABSENT | |
| 14 | bal. | 8.7 | 0.3 | — | — | 61.3 | 0.5 | ABSENT | COMPARATIVE EXAMPLE |
| 15 | bal. | 8.6 | 0.3 | — | — | 53.4 | 0.1 | ABSENT | |
| 16 | bal. | 8.3 | 0.3 | — | 0.09 | 35.5 | 1.2 | ABSENT | |
| 17 | bal. | 8.0 | 0.3 | — | 0.28 | — | — | PRESENT | |
| 18 | bal. | 8.6 | 0.5 | — | 0.47 | — | — | PRESENT | |

EXAMPLES 2

Subsequently, evaluation of a bonding strength and airtight sealing performance was made by testing methods described below with the use of solder alloys indicated in TABLE 2, with Y and Ge added thereto.

(Measurement of Bonding Strength)

Figure 2:
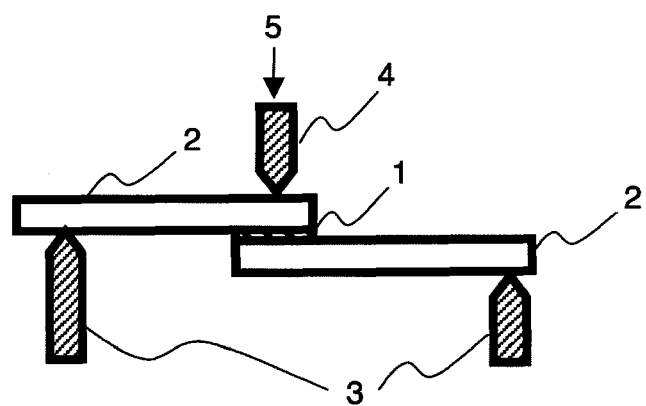
FIG. 2 is a schematic view illustrating a three-point bending test, used in example, for evaluation of a bonding strength.
Figure 3:
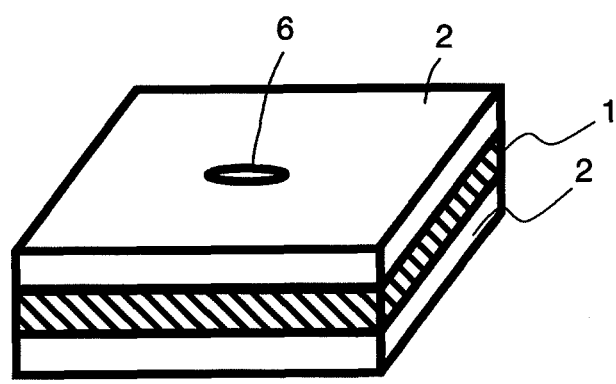
FIG. 3 is a schematic view illustrating a leakage test, used in example, for evaluation of a vacuum sealing performance of a bonded surface.

For measuring a bonding strength, a test piece was prepared by bonding two soda-lime glass substrates 2 together by the solder alloy. The test piece was put to a three-point bending test with the use of a jig shown in FIG. 2. The soda-lime glass substrates 2 had a width of 25 mm, a length of 50 mm, and a thickness of 3 mm. The solder alloy 1 was applied to the two soda-lime glass substrates 2 so that a bonded portion has a length of 6 mm to achieve bonding as shown in FIG. 2. A support jig 3 and a holding jig 4 were used to put the bonded test piece to the three-point bending test. A load 5 was measured when the bonded portion was peeled off, or the glass around the bonded portion was broken. MODEL-1308 manufactured by Aikoh Engineering Ltd. was used as a load evaluation tester.

(Airtight Sealing Performance)

For evaluation of airtight sealing performance, a vessel was prepared by bonding two soda-lime glass substrates 2 by the solder alloy 1 and was vacuumed for a leakage test. First, one soda-lime glass substrate 2 having a thickness of 3 mm, a length of 50 mm, and a width of 50 mm was heated to 380° C., and the solder alloy 1 indicated in TABLE 2 was applied over a width of about 2 mm on the periphery of a surface of the glass substrate. Subsequently, another soda-lime glass substrate having the same dimensions and having a hole 6 of a diameter 3 mm at the center thereof, which had been preheated to the same temperature as described above, was placed on the one glass substrate and bonded. At this time, a piece of stainless foil having a thickness of 0.1 mm (about 1 mm square) was inserted as a spacer between the two soda-lime glass substrates 2 to be bonded, thus fabricating a vessel having a space of a height of 0.1 mm between the soda-lime glass substrates. A leakage detector (HELIOT700 manufactured by Alvac Ltd.) was used to measure a leakage of the vessel, while vacuum-deaerating the space in the vessel and blowing He gases on respective bonded portions.

TABLE 2 shows results of measurements with the testing methods described above.

In the three-point bending test, Examples Nos. 19 to 23 of the invention presented higher bonding strengths than those of Comparative examples Nos. 24 and 25 without addition of Y and Ge as indicated in TABLE 2. In particular, the three-point bending test of Example No. 19 of the invention resulted in breakage starting from the surrounding glass portion rather than peeling-off of the bonded portion. Thus, it was confirmed that a sufficient bonding strength was obtained in bonding with the use of the solder alloy according to the invention.

It was also confirmed in the leakage test that an airtight sealing performance equivalent to or more than that of a solder alloy proposed by the inventors of the present application in WO2007-007840 was obtained. Thereby, bonding providing for an airtight sealing performance while maintaining a high bonding strength could be achieved, and thus effectiveness in the invention could be confirmed.

TABLE 2

| No. | COMPOSITION (MASS %) | | | | | 3-POINT BENDING TEST | LEAKAGE TEST | |
|---|---|---|---|---|---|---|---|---|
| | Sn | Ag | Al | Y | Ge | BREAKING LOAD (N/mm$^2$) | He LEAKAGE (Pa·m$^3$/s) | |
| 19 | bal. | 8.5 | 0.4 | 0.07 | 0.03 | 4.98 | 0.1E−11 | EXAMPLE OF |
| 20 | bal. | 8.6 | 0.1 | 0.07 | 0.04 | 1.87 | 9.2E−07 | INVENTION |
| 21 | bal. | 11.6 | 0.3 | 0.07 | 0.03 | 2.68 | 7.1E−10 | |
| 22 | bal. | 3.9 | 0.3 | 0.07 | 0.03 | 3.27 | 0.9E−11 | |
| 23 | bal. | 8.7 | 2.0 | 0.07 | 0.03 | 2.13 | 9.0E−07 | |
| 24 | bal. | 7.5 | 0.5 | — | — | 1.61 | 6.3E−10 | COMPARATIVE |
| 25 | bal. | 12.0 | 0.5 | — | — | 1.31 | 4.3E−09 | EXAMPLE |

The invention claimed is:

1. A solder alloy consisting of: by mass,
2.0 to 15.0% of Ag;
0.1 to 6.0% of Al;
0.01 to 0.50% of Y;
the balance being Sn and unavoidable impurities.

2. The solder alloy according to claim 1, containing 0.05 to 0.10% of Y by mass.

3. The solder alloy according to claim 1, further containing 0.01 to 0.50% of Ge by mass.

4. The solder alloy according to claim 1, further containing 0.01 to 0.05% of Ge by mass.

5. The solder alloy according to claim 1, wherein the solder alloy is used for bonding oxides together.

6. The solder alloy according to claim 5, wherein the oxides comprise glass.

7. A glass bonded body comprising glasses bonded with the use of the solder alloy according to claim 1.

* * * * *